United States Patent
Dymshits et al.

(10) Patent No.: US 10,706,148 B2
(45) Date of Patent: Jul. 7, 2020

(54) SPATIAL AND TEMPORAL CONVOLUTION NETWORKS FOR SYSTEM CALLS BASED PROCESS MONITORING

(71) Applicant: PayPal, Inc., San Jose, CA (US)

(72) Inventors: Michael Dymshits, Holit (IL); Benjamin Hillel Myara, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 221 days.

(21) Appl. No.: 15/845,199

(22) Filed: Dec. 18, 2017

(65) Prior Publication Data
US 2019/0188379 A1    Jun. 20, 2019

(51) Int. Cl.
G06F 21/56    (2013.01)

(52) U.S. Cl.
CPC ............ *G06F 21/56* (2013.01); *G06F 21/566* (2013.01); *G06F 2221/033* (2013.01)

(58) Field of Classification Search
CPC .. G06F 21/56; H04L 63/1416; H04L 63/1458
See application file for complete search history.

(56) References Cited

U.S. PATENT DOCUMENTS

| | | | |
|---|---|---|---|
| 9,860,262 B2 | 1/2018 | Mainieri | |
| 2004/0193670 A1 | 9/2004 | Langan et al. | |
| 2008/0120720 A1 | 5/2008 | Guo | |
| 2010/0082301 A1* | 4/2010 | Skibiski | H04L 41/0618 702/188 |
| 2014/0317734 A1 | 10/2014 | Valencia et al. | |
| 2016/0078225 A1 | 3/2016 | Ray | |
| 2016/0164912 A1* | 6/2016 | Del Fante | H04L 63/1416 726/23 |

FOREIGN PATENT DOCUMENTS

CN    104933417 A    9/2015

OTHER PUBLICATIONS

International Search Report and Written Opinion received in International Application No. PCT/US2018/066086, dated Mar. 8, 2019.
Dymshits, et al., "Process Monitoring on Sequences of System Call Count Vectors", International Carnahan Conference on Security Technology (ICCST), Jul. 12, 2017.

(Continued)

*Primary Examiner* — Olugbenga O Idowu
(74) *Attorney, Agent, or Firm* — Haynes and Boone, LLP

(57) ABSTRACT

The systems and methods that detect a malicious process using count vectors are provided. Count vectors store a number and types of system calls that a process executed in a configurable time interval. The count vectors are provided to a temporal convolution network and a spatial convolution network. The temporal convolution network generates a temporal output by passing the count vectors through temporal filters that identify temporal features of the process. The spatial convolution network generates a spatial output by passing the count vectors through spatial filters that identify spatial features of the process. The temporal output and the spatial output are merged into a summary representation of the process. The malware detection system uses the summary representation to determine that the process as a malicious process.

20 Claims, 13 Drawing Sheets

(56) References Cited

OTHER PUBLICATIONS

Tobiyama, et al., "Malware Detection with Deep Neural Network Using Process Behavior," IEEE 40$^{th}$ Annual Computer Software and Applications Conference (COMPSAC), Aug. 25, 2016.
Non-Final Office Action issued for U.S. Appl. No. 15/268,278 dated May 17, 2018; 28 pages.

* cited by examiner

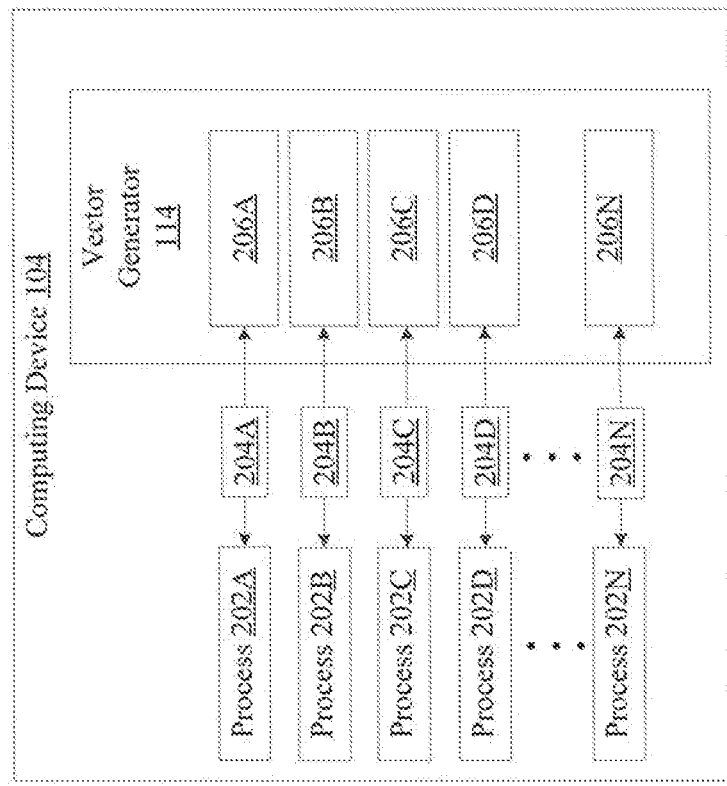

SPATIAL AND TEMPORAL CONVOLUTION NETWORKS FOR SYSTEM CALLS BASED PROCESS MONITORING

TECHNICAL FIELD

The disclosure generally relates to detecting malware and more specifically to detecting malware by processing count vectors representing system calls in convolution networks.

BACKGROUND

Conventional malware detection system detects a malicious process by identifying traces from system calls generated by a process, and then comparing these traces against known benign or malicious processes. Such malware detection system typically runs on the same computing device that executes the process. However, such malware detection system will not work in a network environment where thousands of processes generate millions of system calls each second. Further, filtering some of the system call traces is not a solution because the malware detection system can misclassify a malicious process using the filtered system call traces.

BRIEF DESCRIPTION OF THE DRAWINGS

FIG. 2 is a block diagram of a vector generator, according to an embodiment.

Figure 1:
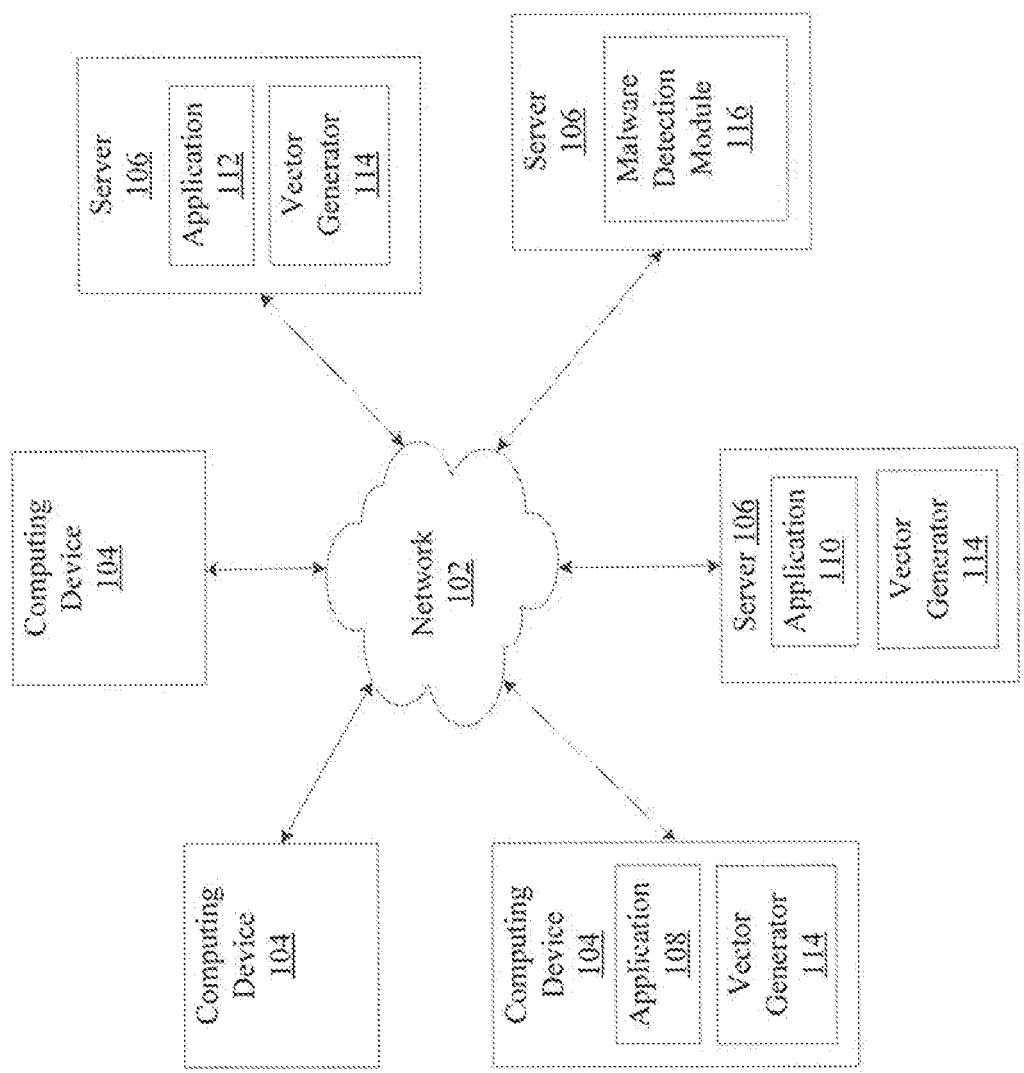
FIG. 1 is an exemplary system where a malware detection system can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The systems and methods provide a malware detection system that uses process traces aggregated into count vectors to determine a malicious process. Process traces are traces of system calls generated by a process executing on a computing device or a server. System calls are requests by the process to the operating system that executes on a computing device for a system resource. Example system resources may be processor time, memory access, access to a file system, etc.

In an embodiment, system calls generated by a process over a predefined time interval may be aggregated into count vectors. Each count vector may include system calls generated by a single process. Each count vector may also be divided into a plurality of components, such that each component of a count vector maps to a type of system call. Further, each component may also be assigned a default value. As the process generates system calls during the predefined time interval, the value of the component that corresponds to a type of the system call is incremented by one. In this way, the count vector represents a number and types of system calls that a process generated over the predefined time interval. An example time interval may be one second.

In an embodiment, a malware detection module described herein uses count vectors to determine whether a process is or includes malware. To determine whether a process is or includes malware, the malware detection module includes a temporal convolution network and a spatial convolution network. The temporal convolution network includes temporal filters. The temporal filters filter count vectors using temporal features. The spatial convolution network includes spatial filters. The spatial filters filter count vectors using spatial features. In an embodiment, the malware detection module also includes a merger. The merger merges the output produced by the temporal convolution network and the output produced by the spatial convolution network into a summary representation of the process. The malware detection module may then classify a process as a malicious process based on the summary representation.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104 and servers 106. Computing devices 104 may be portable and non-portable electronic devices under control of a user and configured to transmit, receive, and manipulate data from servers 106. Example computing devices 104 include desktop computers, laptop computers, tablets, smartphones, wearable computing devices, eyeglasses that incorporate computing devices, implantable computing devices, etc.

Computing devices 104 may include one or more applications 108. Applications 108 may be pre-installed on the computing devices 104, installed on the computing devices 104 using portable memory storage devices, such as compact disks or thumb-drives, or be downloaded to the computing devices 104 from a service provider server that may be one of servers 106, described below. Applications 108 may be executed on the computing devices 104 and receive instructions and data from a user, from servers 106, or from other computing devices 104.

Example applications 108 installed on computing devices 104 may be electronic transaction applications. Electronic transaction applications may be configured to conduct transactions world-wide through computer networks. Further, applications 108 may be under an ownership or control of a payment service provider, such as PAYPAL™ Inc. of San Jose, Calif., USA, a telephonic service provider, a social networking service provider, and/or other service providers. Applications 108 may also be analytics applications. Analytics applications perform business logic, provide services, and measure and improve performance of services and functions of other applications that execute on computing devices 104 based on current and historical data. In another embodiment, applications 108 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) application. Further, applications 108 may be social networking applications and/or merchant applications. In yet another embodiment, applications 108 may be service applications that permit a user of computing device 104 to receive, request and/or view information for products and/or services, and also permit the user to purchase the selected products and/or services.

In an embodiment, applications 108 may utilize numerous components included in computing device 104 to display, receive input, store data, and communicate with network 102. Example components are discussed in detail in FIG. 9.

As described above, servers 106 are also connected to network 102. Example server 106 may be a computing device that includes hardware and software for large scale processing. In another example, server 106 may be a computer program installed on a computing device that provides services to applications 108 installed on multiple computing devices 104. In an embodiment, server 106 may be maintained by a service provider, such as PAYPAL™, a telephonic service provider, social networking service, and/or other service providers. In an embodiment, server 106 may also include or be coupled with applications 110. Applications 110 may be counterparts to applications 108 executing on computing devices 104. Applications 110 may receive, process, and transmit data for content, including transaction requests, transmitted from applications 108. Thus, applications 110 may also be applications configured to facilitate transfer of data for processing the transaction request, such as electronic funds for payment of goods and services, manage money spending, etc. In an embodiment, applications 110 may also be security applications configured to implement client-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications.

In an embodiment, when application 108 transmits requests and/or data for different transactions to applications 110, applications 110 process these transactions. The transactions may be in a form of one or more messages that are transmitted over network 102. In a further embodiment, to process transactions requested by applications 108, 110 may request payment via a payment processing application 112. Application 112 may be on the same or different server 106 as application 110. For instance, the payment processing application 112 may receive transactions from applications 108 and/or applications 110 that cause the payment processing application 112 to transfer funds of a user using application 108 to a service provider associated with application 110.

In an embodiment, payment processing application 112 may be maintained by a payment provider, such as PAYPAL™, financial services provider, credit card provider, bank and/or other payment provider, which may provide user account services and/or payment services to a user.

In an embodiment, as applications 108, 110, and 112 process user requests, transactions, etc., malware may be installed within applications 108, 110, and/or 112, computing devices 104 and/or servers 106 that execute applications 108, 110, and/or 112. Malware may be a process, an application, etc., that, for example, gathers information, obtains access to private computer resources, and/or user's sensitive information. Malware may also disrupt normal functions of computing device 104 by displaying unwanted advertisements, encrypting files and holding the decryption keys for ransom, stealing information, spying on the users, extorting payment, sabotaging functionality of computing devices 104 or server 106, etc. Example malware may include computer viruses, computer worms, "Trojan horses," ransomware, spyware, adware, scareware, etc. Further, example known malware may include Regin, Stuxnet, CryptoLocker, etc. In an embodiment, malware may cause applications 108, 110, and/or 112 to conduct fraudulent transactions, access user data, transmit user data to unauthorized third parties, corrupt computer memory, etc.

One way to determine whether malware exists within or masquerades as applications 108, 110, and/or 112 is to monitor and analyze process traces generated by the applications 108, 110, and/or 112. Process traces may trace system calls generated by applications 108, 110, and/or 112. In an embodiment, to monitor and analyze system calls, FIG. 1 may include a malware detection system. The malware detection system may include a vector generator 114 and a malware detection module 116. The vector generator 114 may execute on computing devices 104 or servers 106 that operate applications 108, 110 and/or 112 and trace system calls generated by these applications. Because applications 108, 110 and/or 112 generate thousands of system calls each second, when vector generator 114 receives traces from applications 108, 110, and/or 112, vector generator 114 formats the traces into count vectors and transmits the count vectors to the malware detection module 116 over network 102. As will be described below, count vectors reduce the amount of the system call information that may otherwise be transmitted over network 102, while preserving the information included in the system calls that malware detection module 116 may use to identify malware.

In an embodiment, malware detection module 116 may operate on one of servers 106 in FIG. 1. In an embodiment, malware detection module 116 receives count vectors from multiple computing devices 104 and servers 106 over network 102 and uses the count vectors to identify malware.

FIG. 2 is a block diagram 200 of vector generator 114, according to an embodiment. Although in FIG. 2, vector generator 114 executes within computing device 104, this embodiment is not limiting, and vector generator 114 may also execute on server 106. In an embodiment, as applications 108, 110, and/or 112 execute on computing devices 104, applications spawn processes 202A-N (collectively referred to as processes 202). There may be multiple processes 202 for each application or one process 202A per application 108.

As processes 202 execute, processes 202 generate system calls 204A-N (collectively referred to as system calls 204). For example, process 202A may generate system calls 204A, process 202B may generate system calls 204B, process 202C may generate system calls 204C, etc. System calls 204 may be requests to a kernel of an operating system that executes on computing device 104 that request system resources for the process. Example system calls 204 may include requests to schedule or initiate another process, file management access requests, device management access requests, information requests between an operating system and processes 202, communication requests, etc. Some exemplary system calls may include "exit," "fork," "read," "write," "open," and "close," though the implementation is not limited to these embodiments. Because each one of processes 202A-N may generate thousands of the respective system calls 204A-N each second, processes 202A-N may generate millions of system calls on computing device 104.

In an embodiment, malware detection system discussed in FIG. 1 may use process traces of the system calls 204 to determine malware that operates on computing device 104. However, because of the sheer volume of system calls 204 generated by processes 202, there is a need to extract information included in the system calls 204 efficiently and without losing or overlooking information that detects malware.

Because of the volume of system calls that are generated on each computing device 104, malware detection system includes vector generator 114. Vector generator 114 may be installed on each computing device 104 that executes processes 202. In an embodiment, vector generator 114 may trace system calls 204 generated by multiple processes 202. From the system call traces, vector generator 114 may generate count vectors 206A-N (collectively referred to as count vectors 206). Each count vector 206 represents system calls 204 generated by one of processes 202 over a configurable, predetermined time interval. For example, count vector 206A represents system calls 204A generated by process 202A, count vector 206B represents system calls 204B generated by process 202B, count vector 206C represents system calls 204C generated by process 202C, etc. In an embodiment, count vectors 206 preserve information included in system calls 204 that were issued during the time interval, but reduce the amount of information transmitted between vector generator 114 and malware detection module 116 over network 102.

Figure 3A:
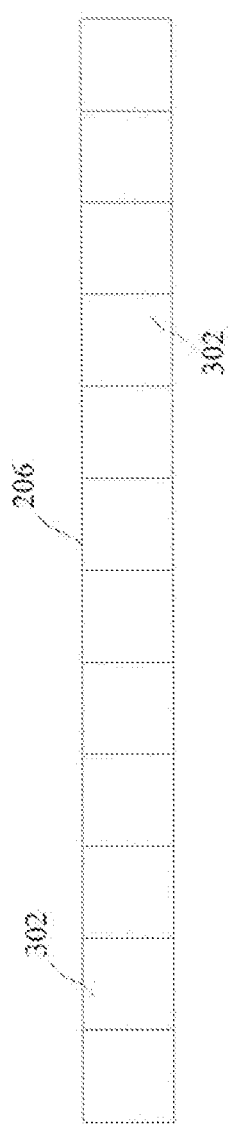
FIG. 3A is a block diagram of a count vector, according to an embodiment.

In an embodiment, count vector 206 may be a data structure implemented in a programming language known to a person of ordinary skill in the art. FIG. 3A is a block diagram 300A of a count vector, according to an embodiment. As illustrated in block diagram 300A, count vector 206 includes multiple components 302. In an embodiment, each component 302 or a position of each component 302 in count vector 206 may be mapped to a type of a system call that exists in the operating system. For instance, if the operating system includes six different types of system calls, count vector 206 may include six components 302, one component per system call type. That is, if the six types of system calls were "exit," "fork," "read," "write," "open," and "close," then each of these system calls would map to one of components 302 in count vector 206.

In a further embodiment, count vector 206 may also store other information related to system calls. For example, a component in count vector 206 may store the names or identifiers of the file descriptors used to read from or write to files requested by the "read" and "write" system calls.

In an embodiment, the size of the count vector 206 may be the sum of the different types of system calls that exist in the operating system. For example, when the operating system includes 300 or more different types of system calls 204, the size of the count vector 206 may be 300. In another embodiment, the size of the count vector 206 may be the sum of the different types of system calls that exist in the operating system and other system call information (if any). In yet another embodiment, the size of the count vector 206 may be configurable and may be expanded as other types of system calls are added to the operating system or as vector generator 114 collects additional system call information from the system call traces.

Figure 3B:
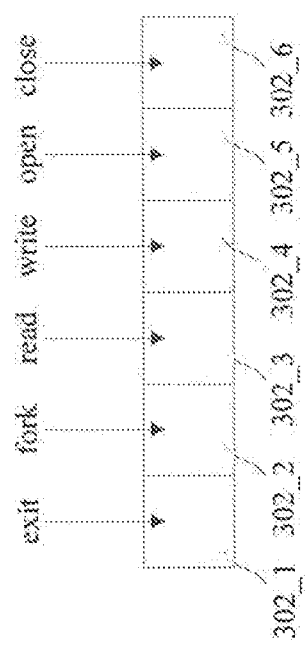
FIG. 3B is a block diagram of a count vector that maps a system call type to an element in the count vector, according to an embodiment.

FIG. 3B is a block diagram 300B of a count vector that maps a system call type to each component 302, according to an embodiment. As illustrated in FIG. 3B, system call "exit" is mapped to component 302_1, system call "fork" is mapped to component 302_2, system call "read" is mapped to component 302_3, system call "write" is mapped to component 302_4, system call "open" is mapped to component 302_5, and system call "close" is mapped to component 302_6.

Going back to FIG. 2, in an embodiment, count vector 206 tracks a number of system calls 204 that occur during a predefined time interval. Example time interval may be a second, two seconds, five seconds, etc., and may be configured within the malware detection system. The configuration may be based on system traffic, number of processes 202 executing on computing devices 104, number of system calls 204 issued by the processes 202, etc.

To track the number of system calls that occur during a predefined time interval, each component 302 may include a counter. The value of the counter represents a number of times a system call of the type mapped to the component 302 occurred during the time interval. The representation may be an integer or a real number, though the implementation is not limited to these embodiments. In an embodiment, the counter may be set to a default value, such as zero. The vector generator 114 may then increment the counter each time the vector generator 114 receives a system call of the type that maps to the component 302 from process 202.

Figure 3C:
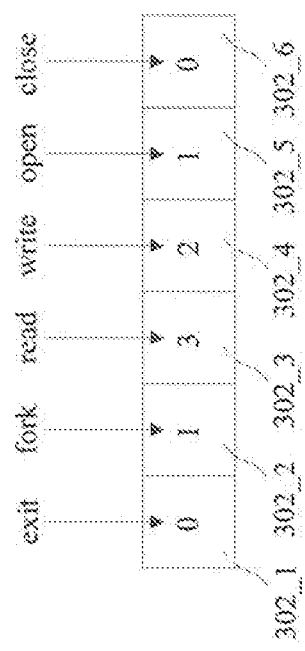
FIGS. 3C-D are block diagrams of a count vector that maps a sequence of system calls to the count vector, according to an embodiment.

FIG. 3C is a block diagram 300C that represents a state of a count vector shown in FIG. 3B, according to an embodiment. This state may occur after the vector generator 114 receives system call traces from a process over a preconfigured time period, such as one second. For instance, the vector generator 114 may receive system call traces for system calls 204 generated by process 202. The system call traces indicate that system calls "fork, open, read, write, read, write, read, write, read" were issued by process 202.

From this system call trace, vector generator 114 may generate a count vector as shown in FIG. 3C. The count vector in FIG. 3C maps each system call to component 302 that is associated with the system call type. For example, component 302_1 associated with the system call "exit" remains set to zero, component 302_2 associated with the system call "fork" is set to one, component 302_3 associated with the system call "read" is set to three, component 302_4 associated with the system call "write" is set to two, component 302_5 associated with the system call "open" is set to one, and component 302_6 associated with the system call "close" remains set to zero.

Figure 3D:
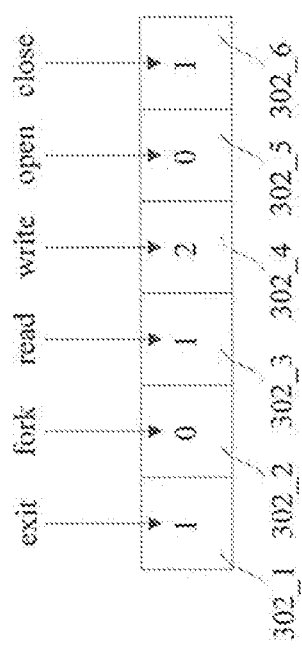

In an embodiment, vector generator 114 generates count vector 206 for system calls 204 that were generated by process 202 during each time interval. For example, during a second time interval, vector generator 114 may receive system call traces for system calls 204 generated by process 202 of FIG. 3C that includes a "write, read, write, close, exit" system calls. For this system call sequence, vector generator 114 may generate count vector 206 that maps each system call in the trace to the component in the count vector 206 as shown in FIG. 3D. For example, component 302_1 associated with "exit" is set to one, component 302_2 associated with "fork" remains set to zero, component 302_3 associated with "read" is set to one, component 302_4 associated with "write" is set to two, component 302_5 associated with "open" remains set to zero, and component 302_6 associated with "close" is set to one.

Going back to FIG. 2, as discussed above, vector generator 114 generates count vectors 206 for each process 202 during a predefined time interval. Each count vector 206 stores a representation of the number and types of system calls 204 that were generated by the corresponding process 202A-N for that time interval. For example, system calls 204A generated by process 202A are mapped to count vector 206A, system calls 204B generated for process 202B are mapped to count vector 206B, system calls 204C generated for process 202C are mapped to count vector 206C, etc.

In an embodiment, once vector generator 114 generates count vectors 206, vector generator 114 transmits count vectors 206 to the malware detection module 116.

Figure 4:
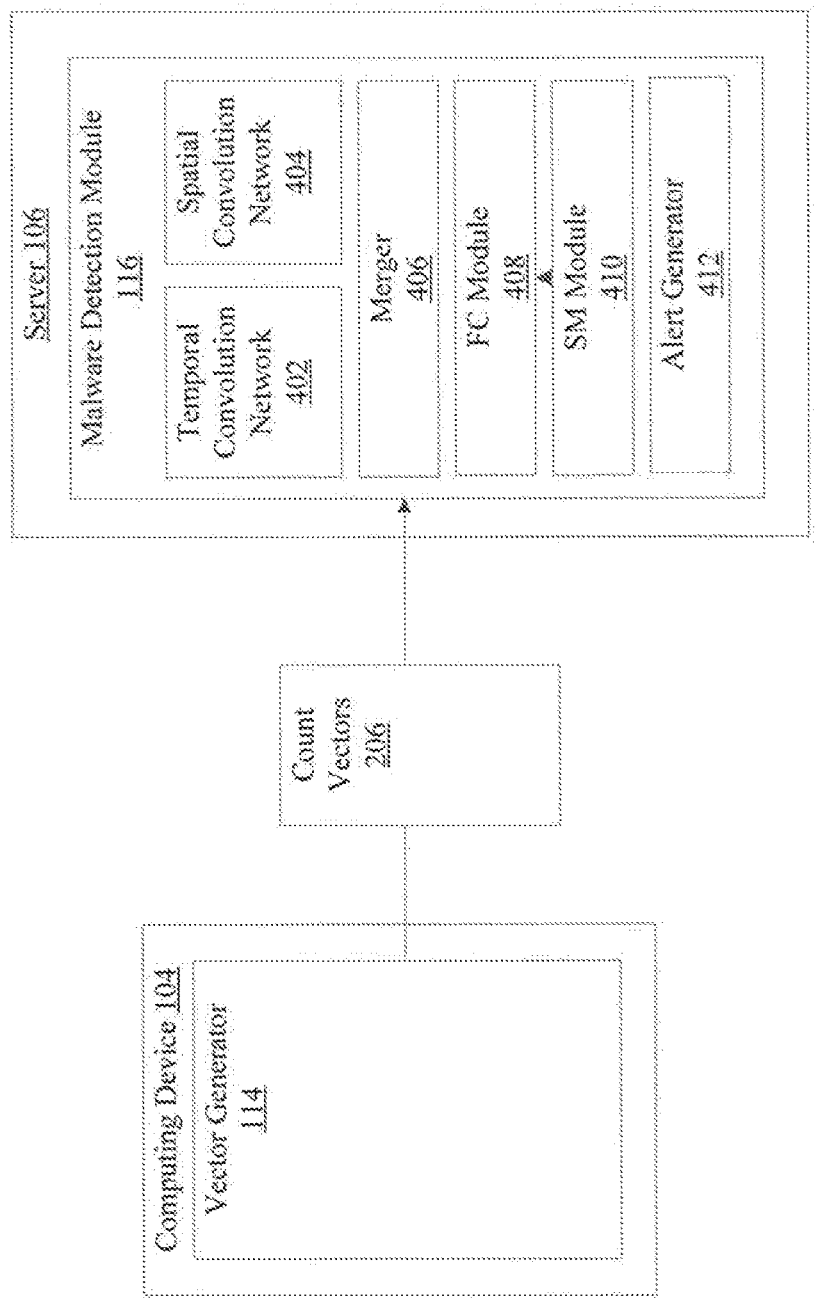
FIG. 4 is a block diagram of a malware detection system, according to an embodiment.

FIG. 4 is a block diagram 400 of a malware detection module, according to an embodiment. Malware detection module 116 receives count vectors 206 from multiple computing devices 104, servers 106, etc. Malware detection module 116 may receive count vectors 206 individually or aggregated into vector packets that include multiple count vectors 206. In an embodiment, vector generator 114 may aggregate count vectors 206 into vector packets before transmitting vector packets to malware detection module 116.

In an embodiment, malware detection module 116 may include machine learning architecture that uses count vectors 206 to detect malware in, or masquerading as, processes 202. Example machine learning architecture may include one or more neural networks, neural sub-networks or a combination thereof. Neural networks are computing systems comprising multiple layers of inter-connecting nodes that self-learn from observational data, such as count vectors 206 generated by known processes 202 in system 100. The first layer in neural networks typically receives data (such as count vectors 206) as input. The first layer then passes the input data through one or more internal layers of inter-connecting nodes. The last layer in neural networks may generate output data. In an embodiment, a node in each layer may include a function or weight that acts on or modifies the data.

In an embodiment, neural networks may be convolution neural networks, such as those used in image processing. In an embodiment, convolution networks described herein explore spatial and temporal correlation that exists in count vectors 206 generated by process 202 and use the correlation to identify malicious processes.

In an embodiment, the nodes of a layer in the convolution neural network may include one or more filters. The filters may be included in one or more layers and also span multiple nodes in each layer. These filters may be trained on a training set that includes known, observational, data. During training, the filters learn the parameters and values that filter count vectors 206 received from multiple computing devices 104. Example training set of data may be count vectors 206 that were generated by known, non-malicious processes 202, and is discussed in detail below.

In an embodiment, a convolution neural network included in malware detection module 116 may be a temporal convolution network 402. In another embodiment, a convolution neural network included in malware detection module may be a spatial convolution network 404. Both temporal convolution network 402 and spatial convolution network 404 may receive count vectors 206 as input.

Figure 5A:
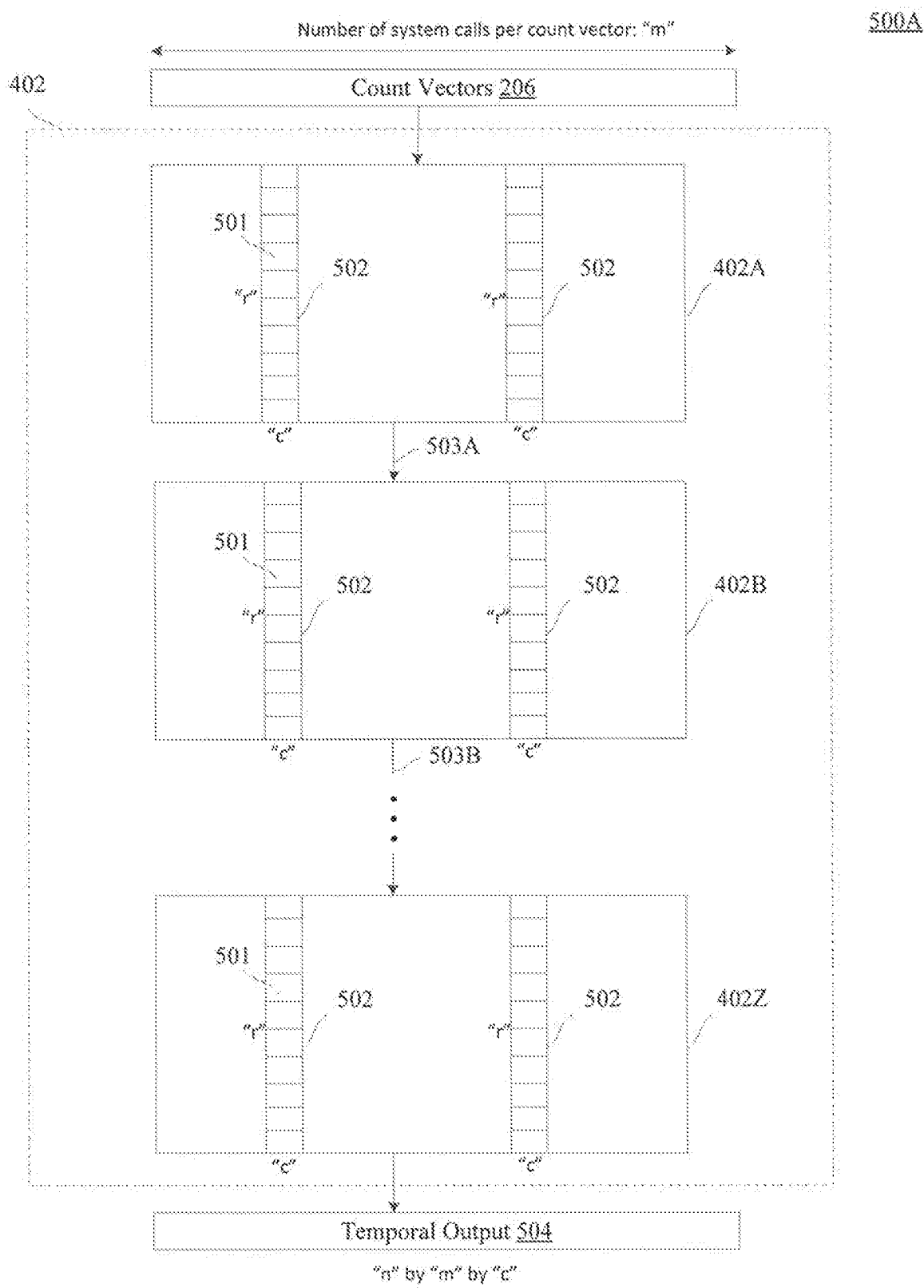
FIG. 5A is a block diagram of a temporal convolution network, according to an embodiment.

In an embodiment, temporal convolution network 402 may pass count vectors 206 through one or more temporal filters that filter count vectors 206 in a time dimension, as described in FIG. 5A. Similarly, in another embodiment, spatial convolution network 404 may pass count vectors 206 through one or more spatial filters in a spatial dimension, as described in FIG. 5B.

In an embodiment, temporal convolution network 402 may pass count vectors 206 through one or more temporal filters and spatial convolution network 404 may pass count vectors 206 through one or more spatial filters sequentially or in parallel.

FIG. 5A is a block diagram 500A of a temporal convolution network, according to an embodiment. As illustrated in FIG. 5A, temporal convolution network 402 may include one or more temporal filters, such as temporal filters 502. The number of temporal filters 502 in temporal convolution network 402 may be configurable. Further, the number of temporal filters 502 may be based on data included in count vectors 206. In an embodiment, "n" may be an integer that represents a number of temporal filters 502 in temporal convolution network 402.

In an embodiment, each temporal filter 502 may include dimensions that, in FIG. 5A, are designated by "r" and "c". In an embodiment, "r" and "c" may be natural, positive number. In an embodiment, "r" is a number of rows 501 in temporal filter 502. Because temporal filter 502 in FIG. 5A has ten rows 501, "r" is equal to 10 in the illustrated embodiment. Further, each row 501 in temporal filter 502 may have a duration set by a preconfigured time interval. Example time interval may be one second, in some embodiments. This time interval may correspond to a time interval over which each count vector 206 was generated by vector generator 114. Accordingly, the temporal depth of each temporal filter 502 may be the number of rows "r" multiplied by a preconfigured time interval for each row 501. Thus, if the number of rows "r" is set to 10, and each row has a time interval of one second, the temporal depth of temporal filter 502 is 10 seconds.

In an embodiment, "c" represents a number of system calls 204 to which a filter is applied. For example, if each system call 204 is filtered individually, then "c" is equal to one. Thus, temporal filter 502 that has 10 rows and that filters each system call 204 has dimensions that are 10×1.

In an embodiment, "r" and "c" may be configured in the malware detection module 116.

Further, temporal convolution network 402 may be configured to include multiple temporal filters 502. In an embodiment, the number of temporal filters 502 may be based on data included in count vectors 206. Further, a matrix that represents temporal filters 502 in temporal convolution network 402 may have dimensions that are "n" by "r" by "c". For example, if temporal convolution network 402 has 64 temporal filters 502, and each temporal filter 502 has dimensions that are 10×1, then temporal filters 502 in temporal convolution network may have dimensions that are 64×10×1.

In an embodiment, each temporal filter 502 may detect one or more temporal features of process 202. Temporal features are pieces of information that may identify process 202, such as the speed of process 202, acceleration of the process 202, etc.

As discussed above, temporal convolution network 402 includes multiple layers, such as layers 402A-Z. In an embodiment, there may be one or more temporal filters 502 in layer 402A-Z or no temporal filters 502 in one or more layers 402A-Z, as configured by malware detection module 116.

In an embodiment, the first layer of temporal convolution network 402 (layer 402A) receives count vectors 206 and passes count vectors 206 through temporal filters 502 associated with layer 402A. As illustrated in FIG. 5A, layer 402A generates output 503A. Temporal convolution network 402 then passes the output 503A of layer 402A as input to the second layer in the temporal convolution network 402 (layer 402B), and so forth. In an embodiment, output 503A may be a "dot product" between entries of one or more temporal filters 502 in layer 402A and some or all components in count vector 206. Similarly, output 503B may be a "dot product" between entries of one or more temporal filter 502 in layer 402B and output 503B. In an embodiment, each layer in temporal convolution network 402 may determine the output of that layer using a "dot product". A "dot product" is a sum of the products of the corresponding entries of the two sequences of numbers. In this case, the first sequence is one of temporal filters 502 and the second sequence is count vectors 206 or output of one of layers 402A-Z.

In an embodiment, once count vectors 206 pass through the last layer of temporal convolution network 402, such as layer 402Z, temporal convolution network 402 generates temporal output 504. Temporal output 504 may be a "dot product" of count vectors 206 with weights of layers that pass through layers 402A-Z of temporal convolution network 402 and temporal filters 502 at each layer 402Z. In an embodiment, temporal output 504 of temporal convolution network 402 may be a matrix having dimensions "n" by "m" by "c", where "n" and "c" are natural, positive numbers as described above, and "m" represents a number of system calls 204 that are represented as components in count vector 206. In an embodiment where each count vector has 400 system calls 204 and temporal filters 502 have dimensions 64×10×1 (as described above), temporal network 402 may have temporal output 504 that has dimensions 64×400×1. In other words, temporal output 504 may include 64 outputs, with each output having dimension of 400×1.

Figure 5B:
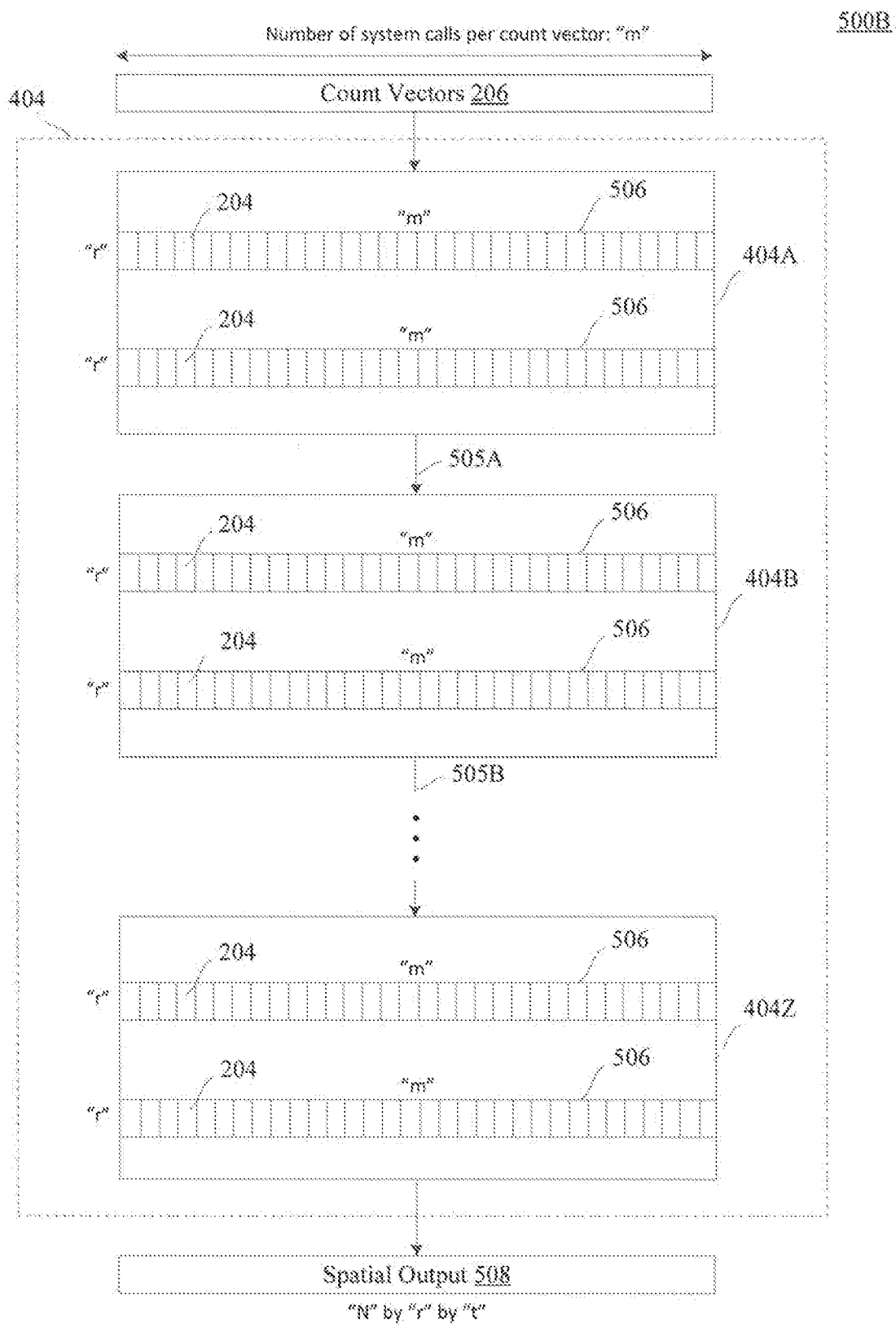
FIG. 5B is a block diagram of a spatial convolution network, according to an embodiment.

FIG. 5B is a block diagram 500B of a spatial convolution network, according to an embodiment. As illustrated in FIG. 5B, spatial convolution network 404 may include one or more spatial filters, such as spatial filters 506. The number of spatial filters 506 in spatial convolution network 404 may be configurable. Further, the number of spatial filters 506 may be based on data included in count vectors 206.

In an embodiment "N" may be an integer that represents a number of spatial filters 506 in spatial convolution network 404. In a further embodiment, the number of temporal filters 502 in temporal convolution network 402 may be the same as the number of spatial filters 506 in spatial convolution network 404. Accordingly, in this embodiment, "n"="N".

In an embodiment, each spatial filter 506 may have dimensions that are designated by "r" and "m" in FIG. 5B. As discussed above "r" represents a number of rows and "m" represents a number of system calls that are included in each count vector 206. In a further embodiment, malware detection module 116 may set the number of rows "r" in spatial filter 506 to one. Accordingly, in an embodiment where there are 400 system calls 204 in each count vector 206 and a number of rows "r" is equal to one, the dimensions of the spatial filter 506 are 1×400.

In an embodiment, a number of spatial filters 506 in spatial convolution network 404 may be configurable. Further, the number of spatial filters 506 may be based on data included in count vectors 206.

In an embodiment, a matrix that represents spatial filters 506 in spatial convolution network 404 may be an "N" by "r" by "m". As such, when spatial convolution network 404 has 64 spatial filters 506 (N=64) and dimensions of each spatial filter 506 are 1×400, the dimensions of spatial filers 506 in spatial convolution network 404 are 64×1×400.

In an embodiment, each spatial filter 506 may detect one or more spatial features of a process. Spatial features are pieces of information that may identify a process in a spatial dimension. Example spatial feature may be a count of how often a system call 204 of a particular type is included in count vector(s) 206.

As discussed above, spatial convolution network 404 includes multiple layers, such as layers 404A-Z. In an embodiment, there may be one or more spatial filters 506 in layer 404A-Z or no spatial filters 506 in one or more layers 404A-Z, as configured by malware detection module 116.

As discussed above, spatial convolution network 404 receives count vectors 206 as input. For example, the first layer of spatial convolution network 404 (layer 404A) receives count vectors 206 and passes count vectors 206 through spatial filters 506 associated with layer 404A to generate output 505A. Count vectors 206 are propagated in this manner through spatial convolution network 404. For example, the second layer in spatial convolution network 404 (layer 404B) receives output 505A is input and generates output 505B, and so worth. In an embodiment, output 505A may be a "dot product" between entries of one of spatial filters 506 in layer 404A and components in count vector 206. Similarly, output 505B may be a "dot product" between entries of one of spatial filters 506 in layer 402B and output 505A. In an embodiment, each layer in spatial convolution network 404 may determine output of that layer using a "dot product".

In an embodiment, once count vectors 206 pass through the last layer of spatial convolution network 404, such as layer 404Z, spatial convolution network 404 generates spatial output 508. Spatial output 508 may be a "dot product" of count vectors 206 with weight of layers that pass through layers 404A-Z of temporal convolution network 404 that is filtered by spatial filters 506 at each layer 402A-Z. In an embodiment, spatial output 508 of spatial convolution network 404 may be a matrix having dimensions "N" by "r" by "t", where "N" is a natural, positive number as described above, and "r" is a number of rows in temporal convolution network 402, and "t" is a time duration of each row. In an embodiment where there are 64 spatial filters 506 and spatial filters 506 have dimensions 64×1×400 (as described above), spatial network 404 may have spatial output 508 that has dimensions 64×10×1. In other words, spatial output 508 may include 64 outputs, where each output has dimensions that are 10×1. In this case, 10 is a number of rows "r", and one is the time duration of each row, such as 1 second in some embodiments.

Going back to FIG. 4, malware detection module 116 also includes a merger 406. Merger 406 may merge temporal output 504 from temporal convolution network 402 with spatial output 508 form spatial convolution network 404. The output of merger 406 is a summary representation that identifies one of processes 202.

Figure 6:
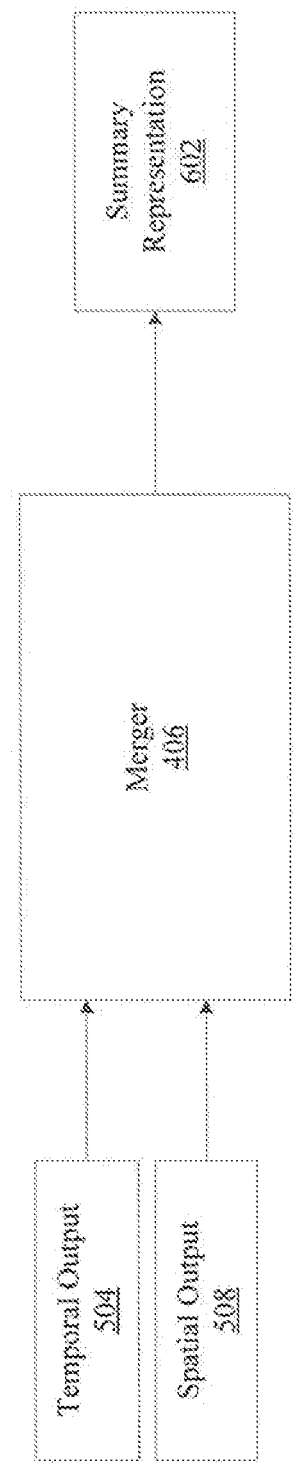
FIG. 6 is a block diagram of a merger that merges output of a temporal convolution network and output of a spatial convolution network, according to an embodiment.

FIG. 6 is a block diagram 600 of a merger, according to an embodiment. As illustrated in FIG. 6, merger 406 receives temporal output 504 and spatial output 508 as inputs. Temporal output 504 may have dimensions "n" by "m" by "c" and spatial output 508 may have dimensions "N" by "r" by "t". In an embodiment, merger 406 merges temporal output 504 and spatial output 508 by multiplying components in dimensions of temporal output 504 and spatial output 508.

In an embodiment, merger 406 generates summary representation 602. Summary representation 602 may be a representation of one of processes 202. Further, summary representation 602 preserves the spatial and temporal characteristics of process 202. Further, because each of processes 202 has unique special and temporal characteristics, summary representation 602 may be different for each unique process 202.

In an embodiment, dimensions of summary representation 602 may be "n" by "z" by "x".

Going back to FIG. 4, malware detection module 116 includes a fully connected layer (referred to as FC module 408). In an embodiment, the FC module 408 processes summary representations 602 received from the merger 406. In an embodiment, prior to processing summary representations 602 generated by merger 406, FC module 408 may be trained on summary representations of known processes.

Figure 7:
FIG. 7 is a block diagram of a fully connected module, according to an embodiment.

FIG. 7 is a block diagram of FC module 408, according to an embodiment. As illustrated in FIG. 7, FC module 408 receive summary representation 602 generated by merger 406. Based on the summary representation 602, FC module 408 determines a process list 702. Process list 702 may include one or more process candidates. The process candidates are processes that may correspond to one of processes 202 that generated count vectors 206.

Going back to FIG. 4, malware detection module 116 includes a softmax readout layer (referred to as a SM module 410). In an embodiment, the SM module 410 receives process list 702 from the FC module 408. SM module 410 may apply a probability classifier to each process candidate in process list 702. The probability classifier determines the probability that each process candidate in process list 702 generated by the FC module 408 is process 202 that generated count vectors 206.

In an embodiment, SM module 410 evaluates ranked process candidates. For example, process candidates with a high rank have a high probability that these candidates represent process 202 that generated count vectors 206. If one of these process candidates with a high rank is a known malicious process, malware detection module 116 may identify process 202 as a malicious process.

In embodiment, malware detection module 116 also includes an alert generator 412. The alert generator 412 generates an alert when malware detection module 116 identifies a malicious process. In a further embodiment, alert generator 412 may also determine when to generate an alert. The alert may indicate a process ID of the malicious process, if count vectors 206 include process ID information, computing device 104 or server 106 that generated the malicious process, the name of the malicious process, etc. Additionally, the alert generator 412 may also indicate other signs that computing device 104 or server 106 has been compromised.

In an embodiment, prior to determining which process 202 generated count vectors 206, malware detection module 116 may be trained. During training, temporal convolution network 402 and spatial convolution network 404 are trained on process traces (count vectors 206) of known processes 202. This is because when processes 202 are known, the count vectors 206 generated by processes 202 are also known. In this case, temporal convolution network 402 uses count vectors 206 to generate temporal filters 502 in such a way that count vectors 206 may be reconstructed from temporal output 504 with sufficient accuracy. In an embodiment, a sufficiently high accuracy may be accuracy that is above a configurable accuracy threshold. Similarly, spatial convolution network 404 uses count vectors 206 to generate spatial filters 506 in such a way that count vectors 206 may be reconstructed from spatial output 508 with accuracy above a configurable accuracy threshold.

In an embodiment, during training, FC module 408 and SM module 410 may learn to classify genuine processes 202 from summary representation 602 of these processes 202. In an embodiment, the training phase continues until FC module 408 and the SM module 410 misclassify the well-known processes at a level that is below a predefined threshold. Once the misclassification reaches a level that is below a predefined threshold, the pre-training phase may be complete.

In an embodiment, after the malware detection module 116 is trained, malware detection module 116 may use count vectors 206 to determine if processes 202 that execute in system 100 are malicious processes, as described above. In an embodiment, when one of processes 202 is an unknown or malicious process, malware detection module 116 may generate an alert and notify a system administrator.

Figure 8:
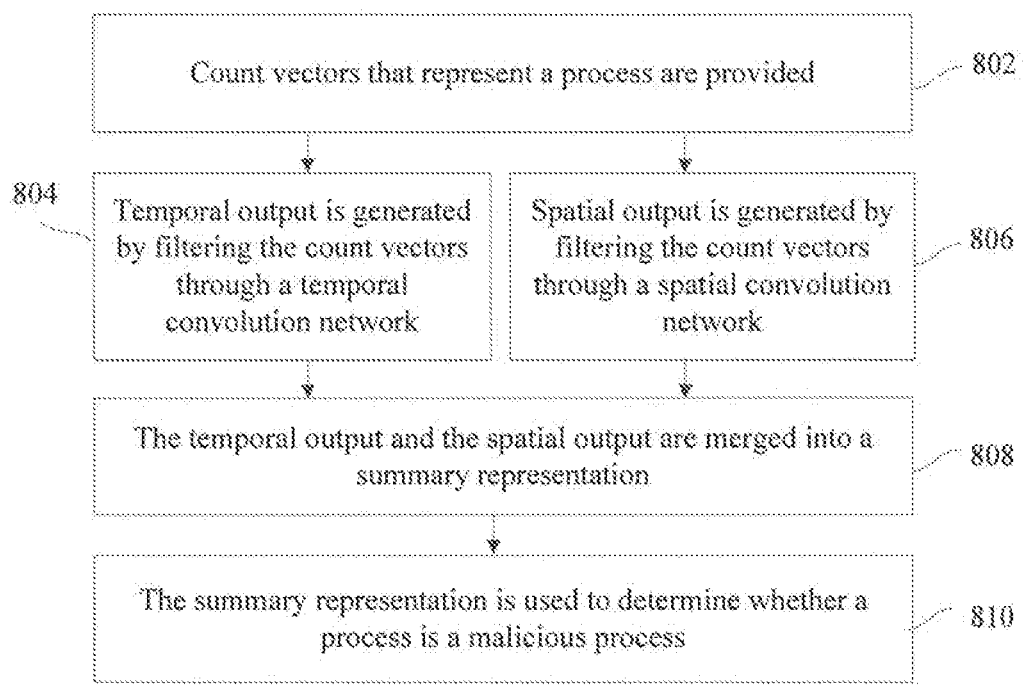
FIG. 8 is a flowchart of a method for identifying a malicious process, according to an embodiment.

FIG. 8 is a flowchart of a method 800 for identifying a malicious process, according to an embodiment. Method 800 may be performed using hardware and/or software components described in FIGS. 1-7. Note that one or more of the operations may be deleted, combined, or performed in a different order, as appropriate. In an embodiment, method 800 occurs after malware detection module 116 is trained using count vectors 206 from known processes 202.

At operation 802, count vectors are provided. For example, count vectors 206 generated by one of processes 202 are provided to malware detection module 116. As discussed above, count vectors 206 include information associated with system calls 204 that one of processes 202 generated during a preconfigured time period.

At operation 804, a temporal output is generated. For example, temporal convolution network 402 passes count vectors 206 through one or more temporal filters 502 to generate temporal output 504. In an embodiment, temporal filters 502 may be included in multiple layers of temporal convolution network 402.

At operation 806, a spatial output is generated. For example, spatial convolution network 404 passes count vectors 206 through one or more spatial filters 506 to generate spatial output 508. In an embodiment, spatial filters 506 may be included in multiple layers of spatial convolution network 404. In an embodiment, operations 804 and 806 may be performed in parallel. In another embodiment, operations 804 and 806 may be performed sequentially.

At operation 808, a representation of a process is generated. For example, merger 406 merges temporal output 504 and spatial output 508 to generate summary representation 602 of count vectors 206 associated with one of processes 202.

At operation 810, a malicious process is determined. For example, FC module 408 and SM module 410 determine whether summary representation 602 matches the summary representation of one of processes 202 identified as known malicious processes.

Figure 9:
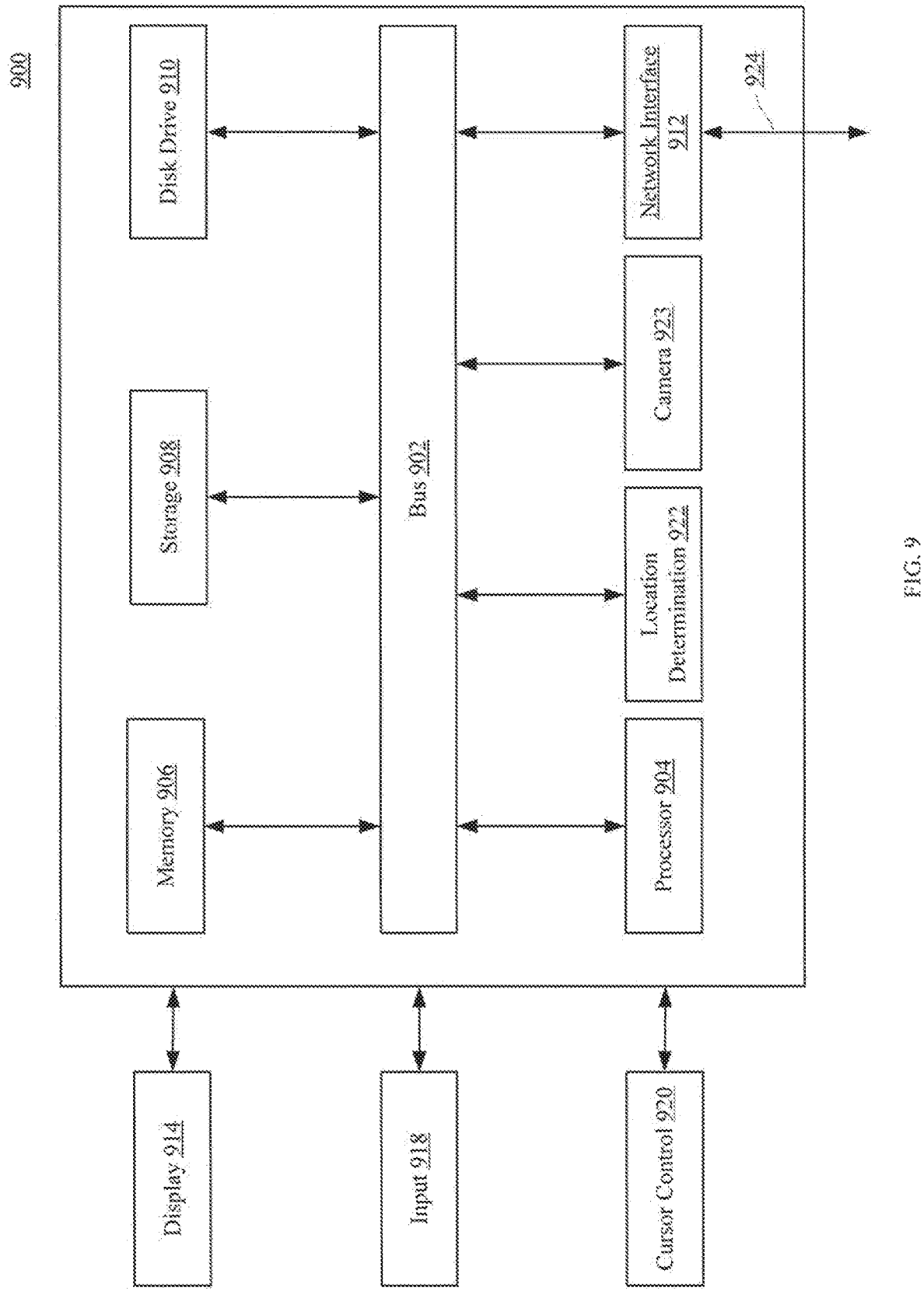
FIG. 9 is a block diagram of a computer system suitable for implementing one or more components in FIGS. 1-8, according to an embodiment.

Referring now to FIG. 9 an embodiment of a computer system 900 suitable for implementing, the systems and methods described in FIGS. 1-8 is illustrated.

In accordance with various embodiments of the disclosure, computer system 900, such as a computer and/or a server, includes a bus 902 or other communication mechanism for communicating information, which interconnects subsystems and components, such as a processing component 904 (e.g., processor, micro-controller, digital signal processor (DSP), graphics processing unit (GPU), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the disclosure, the computer system 900 performs specific operations by the processor 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910. In other embodiments, hard-wired circuitry may be used in place of or in combination with software instructions to implement the disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 900. In various other embodiments of the disclosure, a plurality of the computer systems 900 coupled by a communication link 924 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:
1. A system, comprising:
a non-transitory memory storing instructions; and
one or more hardware processors coupled to the non-transitory memory and configured to read the instruc- tions from the non-transitory memory to cause the system to perform operations comprising:

providing count vectors each having a plurality of components as input to a temporal convolution neural network and a spatial convolution neural network, wherein a count vector in the count vectors stores information corresponding to system calls generated by processes and each component in the plurality of components of the count vector corresponds to a type of system call and a number of times the type of system call occurred in a configurable time interval;

generating, using a plurality of temporal filters in the temporal convolution neural network, a temporal output for the count vectors;

generating, using a plurality of spatial filters in the spatial convolution neural network, a spatial output for the count vectors;

merging the temporal output and the spatial output into a summary representation, wherein the summary representation represents a process that generated the count vectors; and determining, using the summary representation, the process that generated the count vectors.

2. The system of claim 1, wherein generating the temporal output and generating the spatial output occur in parallel.

3. The system of claim 1, wherein a temporal filter in the plurality of temporal filters includes a plurality of rows, and each row in the plurality of rows is associated with a time interval.

4. The system of claim 1, wherein a spatial filter in the plurality of spatial filters corresponds to a number of components in the count vector.

5. The system of claim 1, wherein a spatial filter in the plurality of spatial filters corresponds to the configurable time interval used to generate the count vector in the count vectors.

6. The system of claim 1, wherein a temporal filter in the plurality of temporal filters identifies features of the process that occur over time.

7. The system of claim 1, wherein the spatial filter in the plurality of spatial filters identifies features of the process that correspond to a number and type of system calls the processes generated during the configurable time interval.

8. The system of claim 1, wherein the summary representation preserves temporal and spatial features of the process that generated the count vectors.

9. The system of claim 1, wherein the process that generated the count vectors is a malicious process.

10. A method, comprising:

providing count vectors each having a plurality of components as input to a temporal convolution neural network and a spatial convolution neural network, wherein a count vector in the count vectors includes data representing system calls made by a process to an operating system during a configurable time interval, the data stored in a plurality of components of the count vector, wherein each component in the plurality of components corresponds to a type of system call in the system calls and number of times the type of system call occurred during the configurable time interval;

generating, by passing the count vectors through a plurality of temporal filters in the temporal convolution neural network, a temporal output;

generating, by passing the count vectors through a plurality of spatial filters in the spatial convolution neural network, a spatial output;

merging the temporal output and the spatial output into a summary representation, wherein the summary representation represents the process that generated the count vectors;

determining, using the summary representation of the count vectors, at least one process candidate for the process; and identifying the process that generated the count vectors using the at least one process candidate.

11. The method of claim 10, wherein the process that generated the count vectors is a malicious process.

12. The method of claim 10, wherein generating the temporal output and generating the spatial output occur in parallel.

13. The method of claim 10, wherein a temporal filter in the plurality of temporal filters includes a plurality of rows, and each row in the plurality of rows is associated with a time interval.

14. The method of claim 10, wherein a spatial filter in the plurality of spatial filters corresponds to a number of components in the count vector.

15. The method of claim 10, wherein a spatial filter in the plurality of spatial filters corresponds to the configurable time interval used to generate the count vector in the count vectors.

16. The method of claim 10, wherein a temporal filter identifies features of the process that generated the count vectors that occur over time.

17. The method of claim 10, wherein a spatial filter identifies features of the process that correspond to a number and type of system calls the process generated during the configurable time interval.

18. The method of claim 10, wherein the summary representation preserves temporal features and spatial features of the process that generated the count vectors.

19. A malware detection system, comprising:

a non-transitory memory storing instructions; and one or more hardware processors coupled to the non-transitory memory and configured to read the instructions from the non-transitory memory to cause the system to perform operations comprising:

generating, by a process, a plurality of count vectors each having a plurality of components, wherein a count vector in the count vectors stores information that corresponds to system calls generated by processes and each component in the plurality of components of the count vector corresponds to a type of system call and a number of times the type of system call occurred in a configurable time interval;

processing, using a plurality of filters in a temporal convolution neural network, the plurality of count vectors, wherein the processing generates a temporal output that represents temporal features of the process;

processing, using a plurality of filters in a spatial convolution neural network, the plurality of count vectors, wherein the processing generates a spatial output that represents spatial features of the process;

merging the temporal output and the spatial output into a summary representation, wherein the summary representation represents the process that generated the count vectors; and determining, using the summary representation, the process as a malicious process.

20. The malware detection system of claim 19, wherein the operations further comprise training the malware detection system on known processes to generate the plurality of filters in the temporal convolution neural network and the plurality of filters in the spatial convolution neural network.

* * * * *